United States Patent [19]

Corrado

[11] Patent Number: 4,540,741

[45] Date of Patent: Sep. 10, 1985

[54] NEW UNSATURATED POLYESTER-BASED PRODUCTS

[76] Inventor: Giovanni Corrado, 190, Via Gentile da Mogliano, Rome, Italy

[21] Appl. No.: 613,345

[22] Filed: May 23, 1984

[30] Foreign Application Priority Data

May 24, 1983 [IT]  Italy ............................... 21236 A/83

[51] Int. Cl.$^3$ ............................................. C08G 63/52
[52] U.S. Cl. ........................................ 525/43; 525/44;
528/303; 528/304; 528/306
[58] Field of Search ................. 528/303, 304, 306; 525/43, 44

[56] References Cited

U.S. PATENT DOCUMENTS

| | | | |
|---|---|---|---|
| 2,742,445 | 4/1956 | Lum | 528/303 X |
| 2,973,332 | 2/1961 | Fikentscher et al. | 528/303 X |
| 3,041,305 | 6/1962 | Tessmar et al. | 528/303 X |
| 3,560,445 | 2/1971 | Fekete et al. | 528/303 |
| 3,894,115 | 7/1975 | Bacskai et al. | 528/304 X |

*Primary Examiner*—Lucille M. Phynes

[57] ABSTRACT

New unsaturated polyester resin alkyds are disclosed which have an acid number in the 30 to 60 range, viscous behavior at room temperature, a viscosity not exceeding 300,000 cps at 45° C. and a viscosity not exceeding 500 cps at 25° C. when diluted with styrene up to a content of 31% by weight referred to the total of alkyd plus styrene. The alkyds are obtained by reacting together compounds selected from classes including: (A) acids and unsaturated anhydrides in amounts ranging from 0.4 to 1.0 moles; (B) other dicarboxylic acids; (C) one or more polymeric glycols comprising molecules which contain more than 90% by weight of 1,2-propyleneoxide units at a rate of at least 50%, preferably 60%, moles out of the total of (C)+(D) glycols; and (D) other glycols at a rate of no more than 50% moles out of the total of C+D glycols, there being at all times present at least one component selected from class (A) and at least one component selected from class (C). The invention is also concerned with unsaturated polyester resin compositions incorporating said alkyd and at least one cross-linking monomer selected from vinyl and allyl monomers in amounts no smaller than 10% by weight of the total weight.

16 Claims, No Drawings

NEW UNSATURATED POLYESTER-BASED PRODUCTS

BACKGROUND OF THE INVENTION

1. Field of the Invention

This invention relates to new unsaturated polyester-based products, and in particular, novel alkyds of unsaturated polyester resins having peculiar desirable physical properties.

2. Prior Art

As is known, unsaturated alkyds are apt to react with suitable cross-linking monomers, generally allyl or vinyl monomers, typically such as styrene, to form by cross-linking heat cured saturated polyester resins known for having a very wide range of applications in a number of industrial fields.

The unsaturated alkyd is dissolved, in accordance with prior art teachings, in a suitable amount of the liquid cross-linking monomer, typically styrene, and the resulting solution is sufficiently stable for storage and shipment, it being then reacted, with the addition of appropriate catalysts, at the time of using it.

SUMMARY OF THE INVENTION

This invention is concerned with new unsaturated polyester alkyds and compositions containing them, which exhibit, in accordance with their molecular structures, physical properties effective to confer on them advantageous utilization characteristics, as explained in detail hereinafter.

The unsaturated polyester alkyds of this invention are characterized in that they have in combination the following physical and chemical properties:

(a) an acid number in the 30 to 60 range;
(b) "viscous behavior", as defined hereinafter, at room temperature (25° C.);
(c) a viscosity not exceeding 300,000 cps at 45° C.; and
(d) when diluted with styrene to a content of 31% by weight, a viscosity not exceeding 500 cps at 25° C.

Preferably, viscosity at 45° C. would not exceed 100,000 cps and viscosity in the presence of 31% styrene would not exceed 400 cps at 25° C.

The expression "viscous behavior" as used in this specification and appended claims, refers to the alkyd having a measurable viscosity, preferably not exceeding $5 \times 10^6$ cps. More preferably, the alkyds of this invention have a viscosity not exceeding $2 \times 10^6$ cps at 25° C.

The alkyds of unsaturated polyester are obtained, according to this invention and as is usual for unsaturated polyesters, by reacting together components selected from the following classes:

(A) unsaturated acids and anhydrides; maleic anhydride and acid, fumaric acid, citraconic anhydride and acid; such prime materials being used either alone or mixed together to a total amount in the 0.4 to 1.0 moles range, preferably 0.5 to 1.0 moles.
(B) Other dicarboxylic acids; aromatic dicarboxylic acids and anhydrides such as phthalic anhydride and acid, isophthalic acid, terephthalic acid, tetrachlorophthalic anhydride and acid, etc.; saturated straight or branched chain dicarboxylic acids, such as propandioic, butandioic, adipic, azelaic, sebacic, dodecandioic acids, isomers of trimethyladipic acid, etc.; cycloaliphatic anhydrides and acids, such as tetrahydrophthalic anhydride and acid, 1,4,5,6,7,7-hexachlorobicyclo(2,2,1)heptene-2,3-dicarboxylic anhydride and acid, etc.
(C) One or more polymeric glycols in a proportion of at least 50% moles, preferably at least 60% moles, out of the total of glycols (C) plus (D), comprising molecules containing more than 90% by weight of 1,2-propyleneoxide units, such as obtained by polymerization of 1,2-propandiol either alone or with less than 10% by weight of other glycols.
(D) In addition to said glycols, other glycols may be used, in amounts up to 50% moles out of the total of glycols (C) plus (D), to be selected from: saturated, straight or branched aliphatic and cycloaliphatic glycols, such as ethylene, 1,2 propylene, 1,3 butylene, diethylene glycols, polyethylenics, 1,6 hexandiol, isomers of trimethyl hexandiol, dibromoneopentyl glycol, etc.; arylaliphatic glycols, such as 1,1' isopropylidene-bis-(p-phenyloxy)dipropanol, 1,1' isopropylidene-bis-(p-phenyloxy)-diethanol, etc.; unsaturated aliphatic glycols, such as 1,2 butene, 3,4 diol, 2,3 butene, 1,4 diol, etc.

At least one acid selected from group (A) and at least one glycol selected from group (C) should always be used. The components from groups (B) and (D) may be used optionally.

The relative amounts of the various components, according to the invention, are selected within the following ranges:

acid from group (A): 0.4 to 1.0 moles, preferably 0.5 to 1.0 moles;
acid from group (B): 0 to 0.6 moles, preferably 0 to 0.5 moles, the sum of component (A) plus component (B) being preferably equal to about 1 mole;
glycols from group (C): 0.5 to 1.1 moles, preferably 0.6 to 1.1 moles;
glycols from group (D): 0 to 0.5 moles, preferably 0 to 0.4 moles, the sum of component (C) plus component (D) being preferably included between 1.0 and 1.1 moles.

The preferred glycol is dipropylenic glycol, which is used in amounts ranging from 0.5, preferably 0.6, to 1.1 moles. When that glycol is used, the glycols from group (D) may be used in proportions from 0 to 0.5 moles, preferably 0 to 0.4 moles.

In general, for each class, a single component may be used or several components mixed together. Classes (B) and (D), as mentioned, may also be omitted.

The preparation method does not differ from those generally known in the art, except that care should be taken to stop the condensation between cabroxylic acids and glycols upon the acid number reaching a value in the 30 to 60 range. More specifically, the reaction takes place as follows: in accordance with conventional methods, the mixtures of dicarboxylic acids and glycols in molar ratio ranging from 1:1 to 1:1.1, are reacted with optional excess glycol effective to make up for the losses occurring during the reaction. The reaction is conducted, as is usual, at temperatures in the 150° C. to 250° C. range, either in the absence or presence of aromatic solvents, such as xylene, toluene, etc. functioning as azeotropic agents and in an inert gas medium such as nitrogen, carbon dioxide, etc. Upon the acid number of the mixture reaching a value in the 30 to 60 range, the mixture is cooled. At temperatures in the 30° C. to 190° C., usual amounts of conventional cross-linking inhibitors may be added, such as quinones, hydroquinones, quaternary ammonium salts, nitrophenols, sulphonic acids, etc., either alone or as mixed together.

The alkyd yielded may be stored and shipped as such, or may be additivated with a liquid cross-linking agent, such as styrene, vinyltoluene, α-methylstyrene, chlorostyrene, or some other vinyl or allyl monomer, up to a content of no less than 10%, preferably 20% to 40%, by weight of the total.

Thus, according to the invention, compositions can be obtained and utilized which are of the following types:

Alkyds without styrene having viscosities as specified above and adapted to be shipped for a prolonged transportation time even to tropical countries, without any risk of their gelling on account of the monomer.

Such alkyds, owing to their low viscosity, can be readily diluted in the field with styrene, e.g. by application of heat at temperatures in the 30° C. to 130° C. range, preferably in the 40° C. to 70° C. range.

Unsaturated polyester resins obtained from said alkyds by dilution with styrene or other allyl or vinyl monomers, characterized by a lower viscosity for the same monomer content than conventional resins. For example, such resins with styrene at 31% of the total have a viscosity not exceeding 500 cps, preferably not exceeding 400 cps.

The compositions of this invention are specially useful and advantageous, over conventional ones, in a plurality of applications, such as:

preparation of articles from glass-fiber reinforced resins, wherein a resin having a low viscosity and relatively low contents of styrene or another cross-linking agent is desirable;

preparation of articles as above, having a high degree of transparency;

molding and pre-impregnated bodies;

preparation of solid expanded resinous materials, whether rigid or flexible;

applications where the content of the monomer, in particular styrene, in the air during the process, is to be limited, which is increasingly more desirable for environmental reasons;

application to other fields where the combination of a low viscosity with relatively low contents of allyl or vinyl monomer is favorable.

Furthermore, and as mentioned already, the alkyds of this invention are suitable for storage and shipment without the addition of the cross-linking monomer, which can be an important advantage in certain cases.

The invention will be now further illustrated by means of some non-limitative practical examples thereof.

DETAILED DESCRIPTION OF THE PREFERRED EMBODIMENTS

Example 1

In a 5-liter reaction flask equipped with a mechanical stirrer, downflow coolant, and drawing pipe, a mixture of 954 g 1,2 dipropylene glycol, 584 g maleic anhydride, and 156 g phthalic anhydride, is reacted in an inert gas medium at 190° C.

The mixture acid number is checked on an hourly basis. On the acid number reaching the value of 40 after 7 hours, the mixture is cooled. 0.4 g hydroquinone is added at 120° C. under agitation in an inert gas medium. A liquid alkyd is yielded which has a viscosity of 600,000 cps at 25° C. and 40,000 cps at 45° C.

Example 2

The alkyd obtained as in Example 1 is heated to 40° C. and diluted with 705 g styrene. A resin is yielded which has the following characteristics:

Liquid Resin:
  Brookfield viscosity at 25° C.—350 cps
  Specific gravity at 25° C.—1.125 g/cm$^3$
  Refractive index, n$_D^{25}$—1.5108

Cured Resin:
The resin, as cured with 1.1% benzoyl peroxide for 12 hours at 70° C., and 3 hours at 100° C., has the following characteristics:
  Distortion temperature under heat—90° C.
  Flexural modulus—26,000 kg/cm$^2$
  Ultimate bending stress—1,100 kg/cm$^2$
  Stretch—4%
  Ultimate tensile stress—700 kg/cm$^2$ Measurements were taken in accordance with ASTM Standards.

Example 3

Manual impregnation is effected with conventional methods at room temperature of 270 g chopped strand mat 225 using 500 g of the resin of Example 2, as additivated with 2 cm$^3$ of 6% cobalt octoate and 4 cm$^3$ of 50% methylethylketone peroxide. The article is allowed to cure cold, and is then post-cured at 100° C. for 3 hours.

Samples of the articles, as tested in conformity with ASTM Standards, showed the following characteristics:
  Flexural modulus—85,000 kg/cm$^2$
  Ultimate bending stress—3,000 kg/cm$^2$
  Deflection—7 mm
  Izod, unnotched—130 kg cm/cm

Example 4

In a 10-liter four-necked glass flask equipped with a mechanical stirrer, coolant and downflow pipe, florentine setup for xylene cycle-back, and drawing pipe, there are mixed 2,150 g 1,2 dipropylene glycol, 320 g 1,2 propylene glycol, 1,670 g maleic anhydride, and 444 g phthalic anhydride and 200 cm$^3$ xylene as an azeotropic agent.

The mixture is reacted at 210° C. in an inert gas medium. The acid number is checked every hour. On the acid number of the mixture reaching, after 4 hours, the value of 45, cycle-back is turned off and heat continues to be applied at 210° C. to remove xylene from the reaction environment.

Upon the acid number reaching, after another hour, the value of 37, the mixture is cooled at 120° C., and 0.7 g toluenehydroquinone is added while stirring in an inert gas medium. A clear liquid is yielded which has a viscosity of $2 \times 10^6$ cps at 25° C. and 100,000 cps at 45° C.

Example 5

The alkyd prepared as in Example 3 is heated to 80° C. and diluted with 1,900 g styrene. Thus, an unsaturated polyester resin is obtained which has the following characteristics:

Liquid Resin:
  Brookfield viscosity at 25° C.—440 cps
  Specific gravity at 25° C.—1.12 g/cm$^3$
  Refractive index, n$_D^{25}$—1.5100

Cured Resin:

The resin, as cured with 1% benzoyl peroxide for 12 hours at 70° C., and 3 hours at 100° C., and tested in conformity with the ASTM Standards, has the following characteristics:

Distortion temperature under heat—110° C.
Flexural modulus—27,000 kg/cm$^2$
Ultimate bending stress—1,000 kg/cm$^2$
Ultimate tensile stress—600 kg/cm$^2$
Stretch—2%

Example 6

In a 10-liter reaction flask, equipped as in Example 1, 4,000 g of 1,2 polypropylene glycol with molar weight 400, 1,300 g of 1,2 propylene glycol, and 2,450 g maleic anhydride are reacted together at 180° C. in an inert gas medium.

On the acid number reaching the value of 30 after 8 hours, the mixture is cooled. A liquid is yielded which has a viscosity of 2,000 cps at 45° C. and 10,000 cps at 25° C.

Example 7

In a 7-liter reaction flask, equipped as in Example 1, 2,740 g of 1,2 dipropylene glycol, 1,460 g of adipic acid, and 980 g of maleic anhydride are reacted at 190° C. in an inert gas medium. The acid number is checked hourly. On the acid number reaching the value of 40, the mixture is cooled.

At 150° C., 0.97 g hydroquinone is added while stirring in an inert gas medium.

A liquid is yielded which has a viscosity of 4,000 cps at 45° C. and 30,000 cps at 25° C.

I claim:

1. A ready to use unsaturated polyester resin alkyd having an acid number in the range of 30 to 60, a viscous behavior at room temperature, a viscosity not exceeding 300,000 cps at 45° C. and viscosity not exceeding 500 cps at 25° C. when diluted with styrene to a content of 31% by weight.

2. An alkyd according to claim 1, having a viscosity not exceeding $2 \times 10^6$ cps at 25° C.

3. An alkyd according to claim 1, having a viscosity not exceeding 100,000 cps at 45° C. and viscosity in 31% styrene not exceeding 400 cps at 25° C.

4. A ready to use unsaturated polyester resin alkyd, having an acid number in the 30 to 60 range, a viscous behavior at room temperature, a viscosity not exceeding 300,000 cps at 45° C. and viscosity not exceeding 500 cps at 25° C. when diluted with styrene to a content of 31% by weight, comprising the radical groups originating from the following classes of reacting components;

(A) unsaturated acids and anhydrides; maleic anhydride and acid, fumaric acid, citraconic anhydride and acid, said prime materials being used either alone or mixed together to a total amount in the range of 0.4 to 1.0 moles range;

(B) other dicarboxylic acids; aromatic dicarboxylic acids and anhydrides selected from phthalic anhydride and acid, iso-phthalic acid, terephthalic acid, tetrachlorophthalic anhydride and acid, etc.; saturated straight or branched chain dicarboxylic acids selected from propandioic, butandioic, adipic, azelaic, sebacic, dodecandioic acids and isomers of trimethyladipic acid; cycloaliphatic anhydrides and acids, selected from tetrahydrophthalic anhydride and acid, 1,4,5,6,7,7 hexachlorobicyclic anhydride and acid, 2,2,1 heptene 2,3 dicarboxylic anhydride and acid, etc.;

(C) at least one polymeric glycol comprising molecules containing more than 90% moles of 1,2-propyleneoxide units, as obtained by polymerization of 1,2-propandiol either alone or with less than 10% moles of other glycols;

(D) other glycols; saturated straight or branched aliphatic and cycloalkphatic glycols selected from ethylene, 1,2 propylene, 1,3 butylene, diethylene glycols, polyethylenics, 1,6 hexandiol, isomers of trimethyl hexandiol and dibromoneopentyl glycol; arylaliphatic glycols selected from 1,1' isopropylidene-bis-(p-phenyloxy)-dipropanol and 1,1' isopropylidene-bis-(p-phenyloxy)-diethanol; unsaturated aliphatic glycols selected from 1,2 butene, 3,4 diol and 2,3 butene, 1,4 diol;

there being always present at least one component selected from class (A) above and at least one component selected from class (C) above.

5. A ready to use unsaturated polyester resin alkyd, having an acid number in the range of 30 to 60 range, a viscous behavior at room temperature, a viscosity not exceeding 300,000 cps at 45° C. and viscosity not exceeding 500 cps at 25° C. when diluted with styrene to a content of 31% by weight, comprising the radical groups originating from the following classes of reacting components:

(A) unsaturated acids and anhydrides; maleic anhydride and acid, fumaric acid citraconic anhydride and acid, said prime materials being used either alone or mixed together to a total amount in the 0.4 to 1.0 moles range;

(B) other dicarboxylic acids; aromatic dicarboxylic acids and anhydrides selected from phthalic anhydride and acid, isophthalic acid, terephthalic acid, tetrachlorophthalic anhdride and acid; saturated straight or branched chain dicarboxylic acids, selected from propandioic, butandioic, adipic, azelaic, sebacic, dodecandioic acids and isomers of trimethyladipic acid; cycloaliphatic anhydrides and acids selected from tetrahydrophthalic anhydride and acid, 1,4,5,6,7,7 hexachlorobicyclic anhydride and acid, 2,2,1 heptene 2,3 dicarboxylic anhydride and acid;

(C) dipropyleneglycol;

(D) other glycols; saturated straight or branched aliphatic and cycloaliphatic glycols selected from ethylene, 1,2 propylene, 1,3 butylene, diethylene glycols, polyethylenics, 1,6 hexandiol, isomers of trimethyl hexandiol and dibromoneopentyl glycol; arylaliphatic glycols selected from 1,1' isopropylidene-bis-(p-phenyloxy)-di-propanol and 1,1' isopropylidene-bis-(p-phenyloxy)-diethanol; unsaturated aliphatic glycols selected from 1,2 butene, 3,4 diol and 2,3 butene, 1,4 diol;

there being always present at least one component selected from class (A) above and at least said dipropylene glycol.

6. An alkyd according to claim 4, wherein the components selected from said classes are used in the following relative proportions, acids and anhydrides from class (A): 0.4 to 1.0 moles;
other acids from class (B): 0 to 0.6 moles;
glycols from class (C): 0.5 to 1.1 moles; and
glycols from class (D): 0 to 0.5 moles.

7. An alkyd according to claim 6, wherein the sum of the components selected from classes (A) and (B) above is approximately 1 mole.

8. An alkyd according to claim 6, wherein the components selected from said classes are used in the following relative proportions, acids and anhydrides from class (A): 0.5 to 1 mole;
other acids from class (B): 0 to 0.5 moles;
glycols from class (C): 0.6 to 1.1 moles; and
glycols from class (D): 0 to 0.4 moles.

9. An alkyd according to claim 6, wherein for the glycol from class (C) above, dipropylene glycol is used in a proportion from 0.5 to 1.1 and that the proportion of the glycol from class (D) varies from 0 to 0.5.

10. An unsaturated polyester resin composition comprising an alkyd according to claim 6 and at least one cross-linking monomer selected from vinyl and allyl monomers in amounts of no less than 10% by weight of the total.

11. A composition according to claim 10, comprising from 20% to 40% by weight of the total of a cross-linking monomer.

12. A composition according to claim 10, wherein said cross-linking monomer is selected from a class including styrene, vinyltoluene, α-methylstyrene and chlorostyrene.

13. A composition according to claim 10, having a viscosity not exceeding 500 cps.

14. A composition according to claim 13 having a viscosity not exceeding 400 cps.

15. A composition according to claim 13, exhibiting in combination low viscosity and relatively low content of said cross-linking monomer.

16. A method of preparing an alkyd as claimed in claim 4, wherein mixtures of dicarboxylic acids and glycols in molar ratios ranging from 1:1 to 1:1.1 are reacted together, with the optional presence of excess glycol, at temperatures in the 150° C. to 250° C. range, and wherein the reaction is stopped upon the acid number of the reaction mixture reaching a value in the range of 30 to 60.

* * * * *